United States Patent [19]

Lindley

[11] 4,413,439
[45] Nov. 8, 1983

[54] MOUSETRAP

[76] Inventor: Donald C. Lindley, 3 Skipper, Irvine, Calif. 92714

[21] Appl. No.: 348,270

[22] Filed: Feb. 12, 1982

[51] Int. Cl.³ .......................................... A01M 23/20
[52] U.S. Cl. ..................................................... 43/61
[58] Field of Search ............................................ 43/61

[56] References Cited
U.S. PATENT DOCUMENTS

| | | | |
|---|---|---|---|
| 1,861,478 | 6/1932 | Kleffman | 43/61 |
| 2,073,373 | 3/1937 | Kahn | 43/61 |
| 2,793,464 | 5/1957 | Bird | 43/61 |

Primary Examiner—Nicholas P. Godici
Assistant Examiner—Marc Hoduk
Attorney, Agent, or Firm—Donald D. Mon

[57] ABSTRACT

A mousetrap having a housing with a top, a bottom, and a peripheral wall to form an enclosure in which to trap a mouse. An entry port through the peripheral wall admits the mouse to one arm of the enclosure. A closure hinged near the top of the entry port can swing down to close it. The entry port is at one side of an interior partition that divides the enclosure into two arms and a bend. A hinged trigger is disposed in the other arm. A latch system includes a deflectable post, a finger connected to the trigger. The finger rests on a latching surface on the post to hold the closure open. The weight of a mouse on the trigger causes the cam to deflect the post and release the finger and closure to close the entry port, trapping the mouse inside. When the enclosure is air tight, the mouse endures a brief period of heat prostration, followed by unconsciousness, and a humane death from asphyxiation.

28 Claims, 7 Drawing Figures

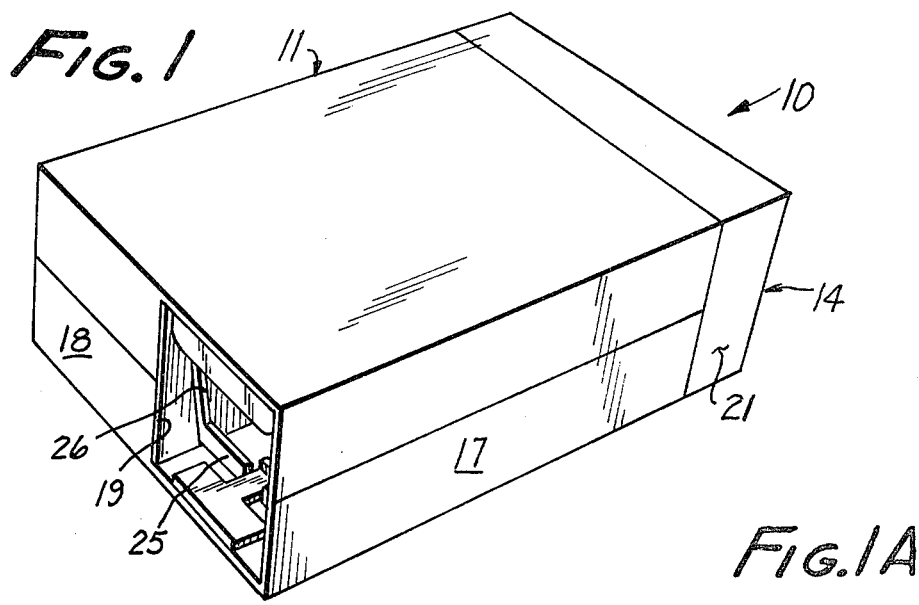
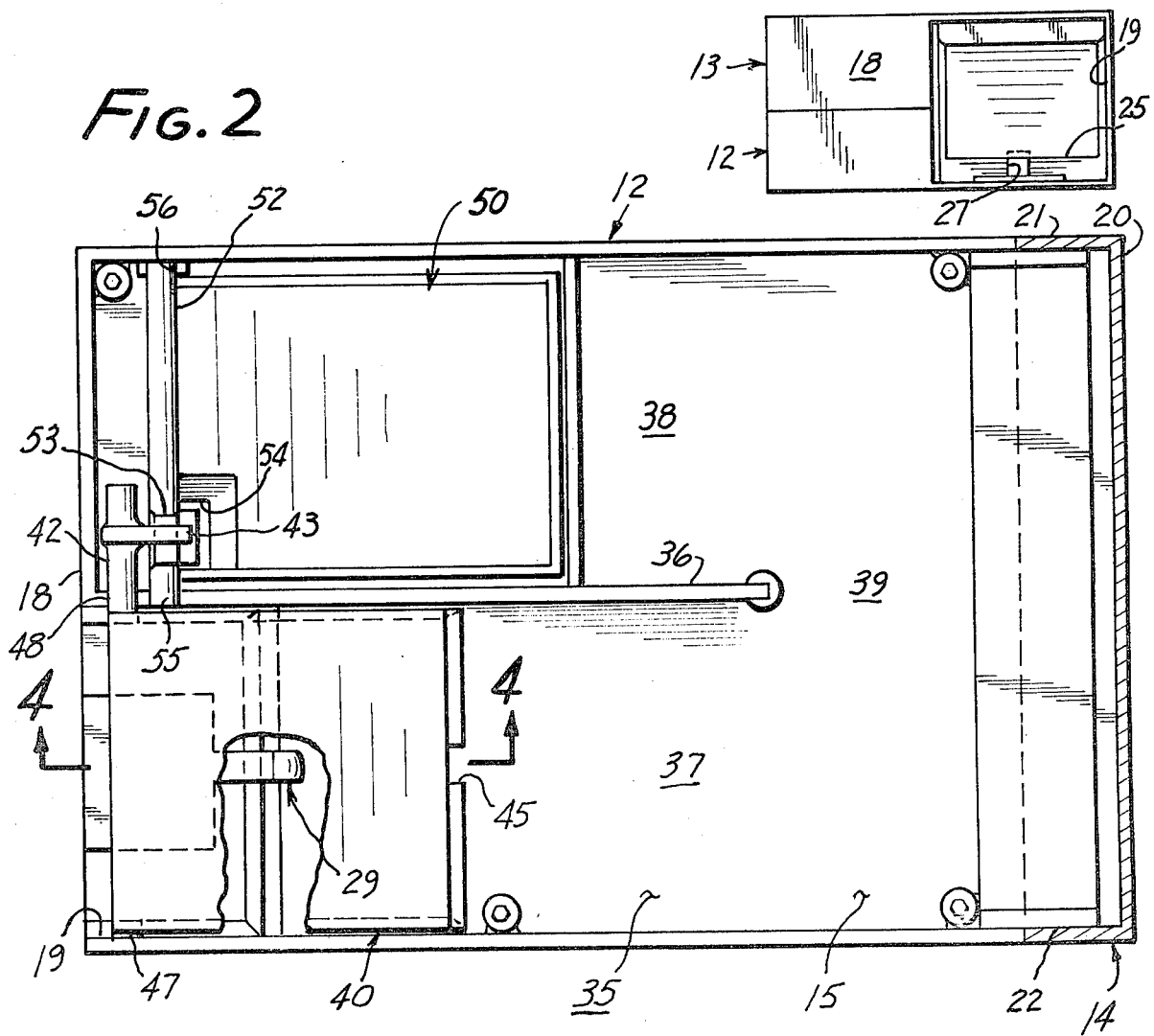

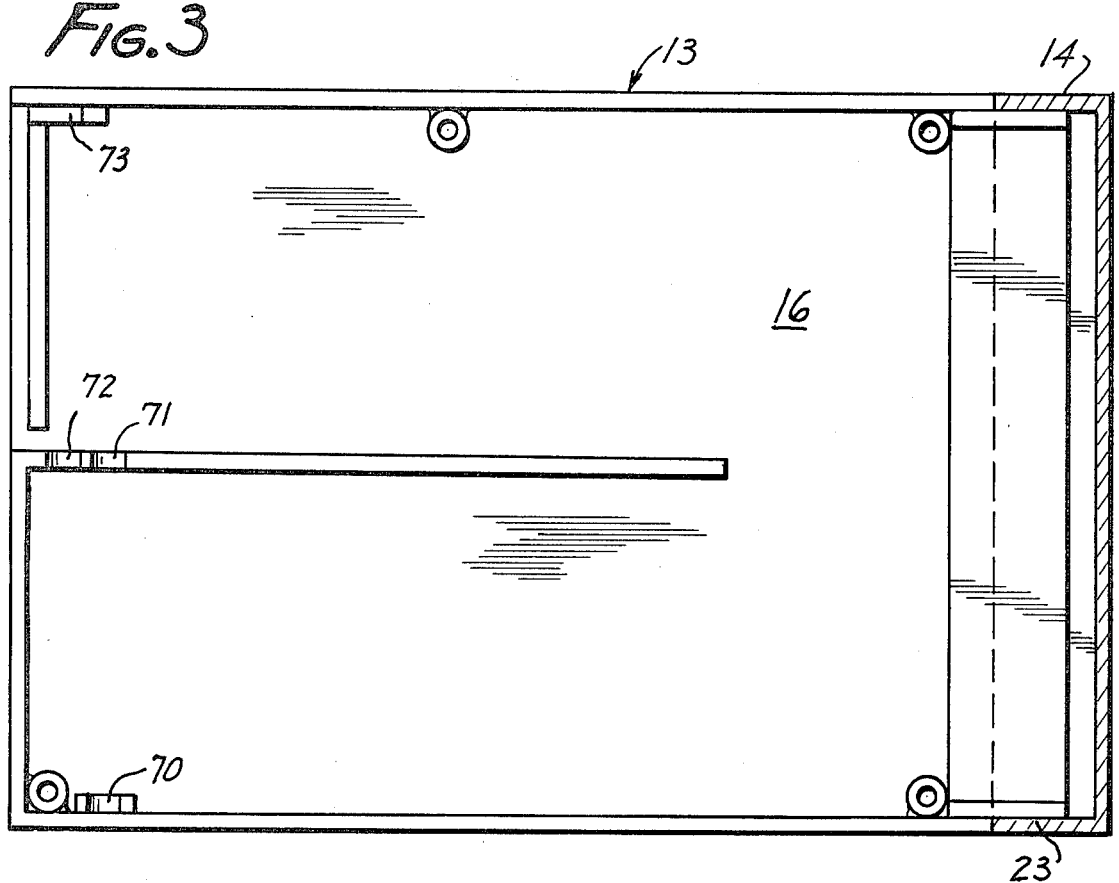
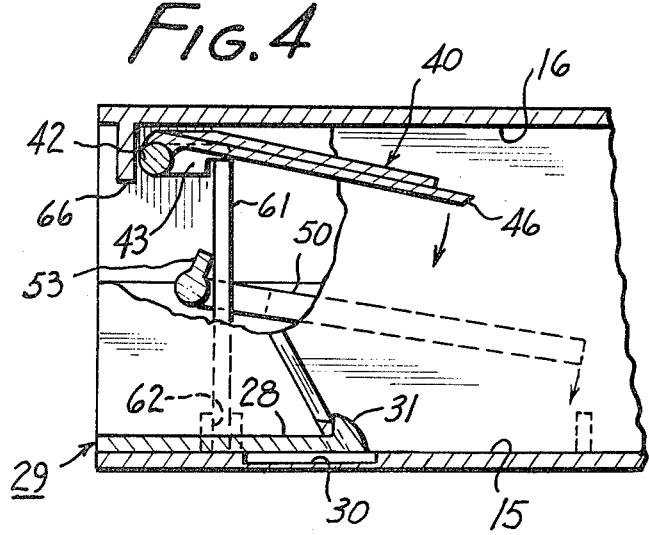
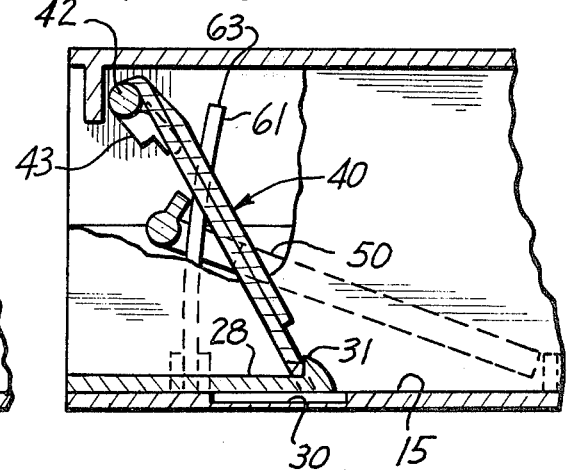

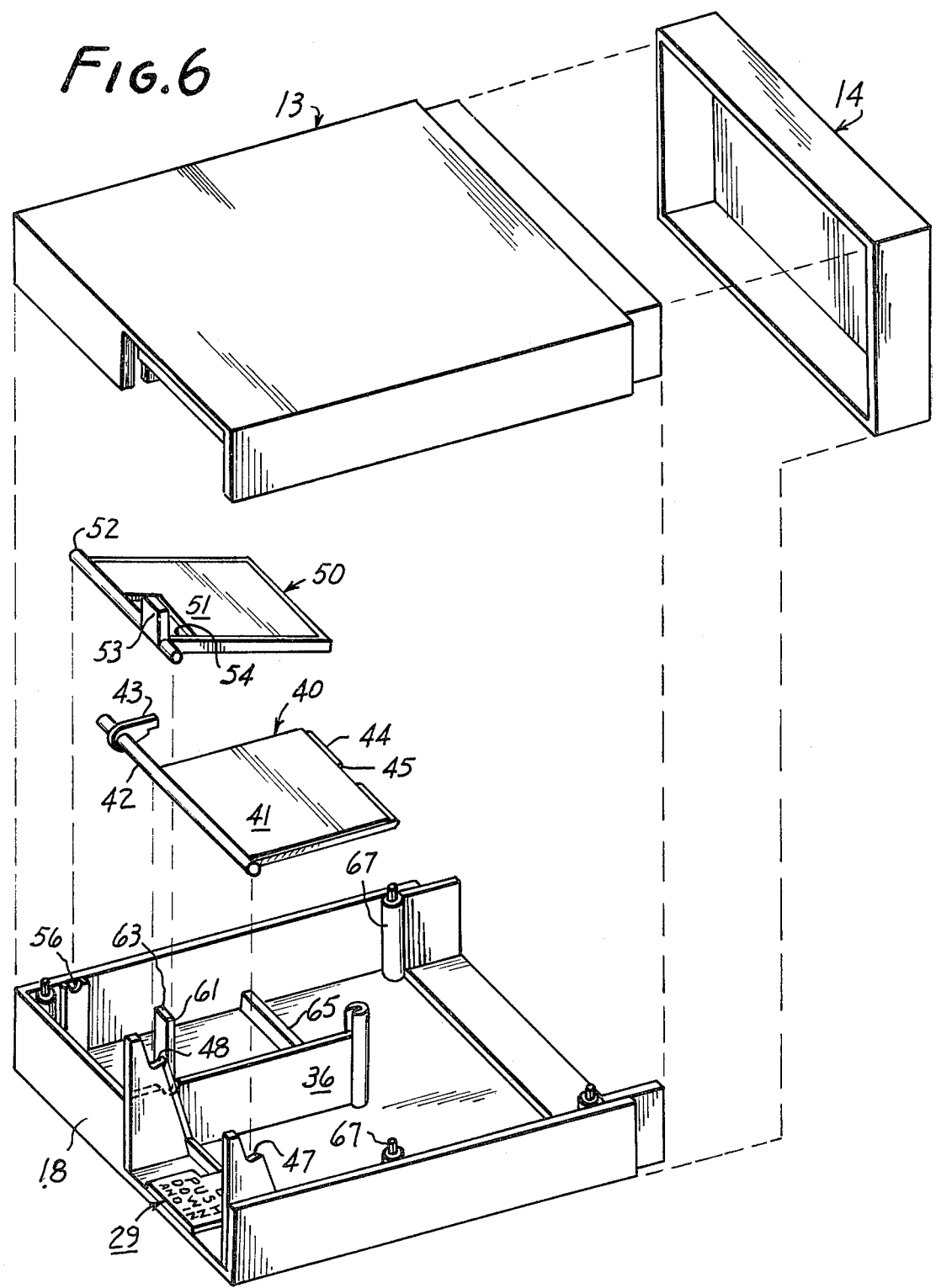

MOUSETRAP

FIELD OF THE INVENTION

This invention relates to mousetraps.

BACKGROUND OF THE INVENTION

Because the mouse is one of the most common of rodents and causes great economic loss, it is not surprising that the trapping art is replete with various types of traps for catching mice. Despite the large number of ideas for mousetraps, there still is missing from the prior art a trap which can be manufactured at low cost, which can be set and also when sprung handled without risk or esthetic offense to the user, and which causes a prompt and relatively humane death of the rodent. Neither has there been provided a trap which can be manufactured inexpensively enough that it can economically be thrown away after each use, but which can be reused if desired. Because mice harbor lice and fleas, it is better not to handle their dead bodies, and an economically disposable trap represents a considerable health advantage, as well as an improvement for the housewife who need not even see the dead body.

For example, the most common mousetrap uses a spring-loaded metal hoop which must be set against a strong spring, and when sprung travels over the head of the rodent and is supposed to kill it by a blow and hold it in place until it is disposed of. The problem with such a trap is that constitutes a risk to the person setting it, that sometimes it does not succeed in killing the rodent, and that when it is successful it frequently makes an unsightly mess that the housewife dislikes either seeing or handling.

The success of the foregoing mousetrap has led others to propose receptacle type traps in which the rodent is coaxed to enter and which will by one means or another trap the mouse inside for later disposal. Generally speaking, these have suffered from an excessive size, cost, and unreliability caused by complexity or by a substandard concept of relative movement of parts to trap the mouse.

It is an object of this invention to provide a mousetrap which can readily be set with no more effort than the push of a finger, which will coax the mouse to enter an enclosure, and close a closure that will keep the rodent in the trap. Due to the rodent's relatively high metabolic rate and insufficiency of oxygen in the enclosure, the mouse will soon become unconscious from heat prostration and will die from lack of oxygen in a relatively short time without risk to the user, and without physically injuring the rodent or causing it undue pain or discomfort.

BRIEF DESCRIPTION OF THE INVENTION

A mousetrap according to this invention has a housing with a bottom, a top, and a peripheral sidewall which together form an enclosure in which to trap a mouse. A partition inside of and extending part way across the enclosure forms the enclosure into an enlongated U-shaped chamber having a first and a second arm on opposite sides of a bend. An entry port through the sidewall opens into the first arm, and a closure is hinged to the housing for rotation around a hinged axis. The closure is adapted to close the entry port. A trigger is placed in the second arm in general alignment with the closure, and a bait is placed nearby. The trigger receives the weight of a mouse approaching the bait so as to release the closure to close the entry port when a mouse depresses it. A latch system is provided between the trigger and the closure to hold the closure open to permit it to close the entry port when a mouse has depressed the trigger. The latch system includes a deflectable post mounted to the housing carrying a latching surface spaced from the point of attachment of the post to the housing. The post inherently tends to assume a condition where the latching surface is in a known first position. A cam is carried by the trigger which is adapted to deflect the post so as to move the latching surface. When the trigger is cocked, a finger on the closure rests on the latching surface so as to hold the closure open. When the trigger is stepped on by the mouse, the cam on the trigger deflects the post so as to move the latching surface away from underneath the finger on the closure, and this releases the closure to close the entry port.

According to a preferred but optional feature of the invention, a releasable detent is provided to allow the closure to close the entry port and then hold it closed until the detent is released.

According to another preferred but optional feature of the invention, a plurality of bearing mounts is provided for bearing means carried by the closure and by the trigger, whereby the trigger and the closure are rotatably mounted to the housing and can be loaded into a bottom part of the housing when the housing is made in two portions.

The above and other features of this invention will be fully understood from the following detailed description and the accompanying drawings, in which:

BRIEF DESCRIPTION OF THE DRAWINGS

FIG. 1 is a perspective view of a mousetrap according to the invention;

FIG. 1A is a left-hand face view of FIG. 1;

FIG. 2 is a top plan view of a bottom portion of the mousetrap of FIG. 1;

FIG. 3 is a top plan view of the top portion of the mousetrap;

FIG. 4 is a cross-section taken at line 4—4 in FIG. 2 showing the mousetrap in its cocked (ready, set) position; and FIG. 5 is a view similar to FIG. 4 showing the trap in its closed (sprung) position, FIG. 6 is an exploded view of the mousetrap as shown in FIG. 1,

DETAILED DESCRIPTION OF THE INVENTION

In FIG. 1 there is shown a mousetrap 10 according to the preferred embodiment of the invention, which represents the best mode known at the present time. The mousetrap includes a housing 11 which is generally shaped as a rectangular parallelipiped. The housing may be conveniently manufactured in several primary portions, namely a bottom portion 12, a top portion 13 and an end cap 14. The housing provides a botton 15 (FIG. 2), a top 16 (FIG. 3), and a peripheral sidewall 17. End face 18 of sidewall 17 has an entry port 19 through it. The end cap forms a face opposite from face 18. As can be seen in FIGS. 2 and 3, the end cap not only provides end face 20, but also a skirt 21 which fits over recessed portions 22, 23 of bottom portion 12 and top portion 13, respectively.

Bottom portion 12 includes a sill 25 which extends across the bottom and includes a pair of rising portions 26 which form something of a frame for the entry port. The sill is recessed inwardly from end face 18, and is bevelled to make a close fit with a closure. Sill 25 has a gap 27 to pass the flexible blade 28 of a detent 29. The detent is a separate piece cemented to the bottom, and there is a hollow 30 formed in the bottom just beneath the flexible blade to permit it to be deflected downwardly. The detent includes a catch 31 which can be moved downwardly by pressing on the flexible blade. The flexible blade inherently tends to return the catch to the upper position shown in FIG. 4.

As best shown in FIG. 2, the housing forms an enclosure 35, and the bottom portion includes a partition 36 which extends part way across the enclosure to form it as an elongated, U-shaped chamber having a first arm 37 and a second arm 38 which are joined by a "bend" 39. The purpose of the partition is to provide a longer path for the mouse to take so that its tail will be inside the enclosure when the mouse steps on a trigger that is to be described. This arrangement also enables a compact latch system to be utiliized because of a side-by-side adjacency yet to be described.

A closure 40 is provided to close the entry port when a mouse is in the trap. The closure includes a plate 41 having a small weight which preferably is sufficient to cause the closure to fall to close the entry port when it is released, although a bias spring could be added, or relied on instead of the weight, if desired. In either event, the closure may be considered to be "biased" toward its closed position. The plate has a bevelled edge so as to make a close fit with the frame which frustrates a mouse's efforts to pry the closure open.

The closure additionally includes a bearing shaft 42 and a finger 43. The entire closure structure is cast integrally as a single piece. At its lower edge 44 the closure has a notch 45 to fit over the flexible blade of detent 29, thereby permitting the closure to come against the frame and sill. A bevel 46 is best shown in FIG. 4. Bearing mounts 47, 48 are molded as part of the lower portion to receive bearing shaft 42. The closure can be loaded from the top before the top portion is applied to the bottom portion.

A trigger 50 includes a platform 51 which it is expected that the mouse will step upon when attempting to reach a bait (not shown). The bait could be a peanut oil-soaked piece of paper beyond platform 51, or even may be a section of the platform treated with peanut oil which is a powerful attractant to mice. The trigger further includes a bearing shaft 52, and on the bearing shaft a cam 53 projecting upwardly, the platform, bearing shaft, and cam being molded integrally. An opening 54 is formed in the platform for a purpose yet to be described. Bearing mounts 55, 56 are provided in the bottom portion to receive bearing shaft 52 and mount it for rotation.

A latch system is provided for holding the mousetrap in its cocked position. For this purpose there is provided a post 61 which is stiffly deflectable. It is held in a socket 62 in the bottom portion, rises as a column, and functions as a stiffly bendable blade having an inherent first condition shown in FIG. 4 and a second deflected condition shown in FIG. 5. It assumes one or the other of these two positions depending on the condition of the trigger. The post passes upwardly through opening 54 in the trigger platform and is borne against at a mid-section by cam 53. The cam always bears against the post.

When there is no mouse on the trigger, the force exerted by the cam is insufficient to bend the post. When a mouse in on the platform as shown in FIG. 5, the trigger moves down, rotating the cam, and the cam deflects (bends) the post to one side. The post has a latching surface 63, preferably at its upper end, which has a first position shown in FIG. 4 and a second position shown in FIG. 5. Finger 43 rests upon latching surface 63 in the cocked (ready) condition of the trap and is freed from this restraint, as shown in FIG. 5 when the post is deflected.

As a further refinement, another sill 65 is provided in the second arm to discourage the mouse from getting beneath the trigger. If desired an upper skirt 66 may be provided over the top of the entry port the better to guide the rodent beneath the closure.

The various circular items shown in FIGS. 2 and 3 such as item 67 are reinforcements, sprues, and assembly guides and pins used in the molding and assembly processes.

In FIG. 3 additional mount means 70, 71, 72 and 73 are shown which are located in the top portion. These hold the respective shaft against the lower mount means or at least prevent it from readily coming loose.

The assemby of the device is made by first placing the trigger and then the closure in the bottom part in the relationship as shown in FIG. 2, then putting the top portion on and joining them together. The top and bottom portions may readily be solvent welded together. Then the end cap is slipped on. If desired, the end cap need not be provided as a separable item, but instead it could be eliminated, and its surfaces could be made part of the top and bottom portions. Then the trap could not readily be reused.

When the trap is to be set, the user merely presses down on the detent so as to free the door (the detent is an optional feature) and pushes the closure inward and upward until the finger clears the post, the post having the tendency to return to the position of FIG. 4 when not restrained by the finger. The inherent force of the post pushing against the cam will cause the trigger to rise, and the finger will come to rest on the latching surface when the user's hand is removed. The trap then is in readiness. This is all that the user has to do.

When the mouse enters the entry port and creeps around the U-shaped chamber, it wishes to approach the bait. In so doing it will step on the trigger and depress it. By this time its tail will have passed through the entry port. Now the condition shown at FIG. 5 results, wherein rotation of the trigger shaft will cause rotation of the cam, which will deflect the post as shown. The latching surface moves out from underneath the finger, and the closure will drop of its own weight, passing over the detent which is lightly sprung. The closure fits closely against the sill and frame. The trap will remain in this condition until it is reset. It will now be seen that the enclosure, which will preferably be formed as an air-tight housing, will not only retain the mouse but will restrict the supply of air, if any, to a level below that which is needed for the mouse to survive, with its high metabolic rate. The mouse will quickly begin to overheat and will pass out from heat prostration. Thereafter it will die a painless death from asphyxiation. Preferably the face of the closure will be colored red so that the user can recognize that the trap has been sprung, by simply noting that the entry port is closed, this being shown by the red color. About forty minutes should be allowed for the mouse to expire, and this will prevent surprises to the user. Should the device be provided with an end cap and the user decides to reuse the trap then the end cap will be removed and the mouse simply dumped into the trash or otherwise disposed of. Otherwise, the trap itself may be thrown away with the mouse in it. Because of its simple and inexpensive construction it is economically feasible for this to be done.

Advantages will be noted in the very compact and simplified latch system. Every part of the device can be manufactured from readily molded and inexpensive organic plastic materials and the device is easily adapted to rapid and inexpensive assembly. If desired, the sill can be provided as a separate part put in place the same time as the detent. Further, if desired the sill and the detent may be omitted, simply relying on the closure to close the entry port sufficiently both to trap the rodent and to exclude sufficient air for it to survive. However the provision of the bevelled edges and the detent are useful to frustrate efforts by the rodent to use its claws to pull the closure open.

The closure can, of course, be spring-loaded toward the closed position, and such an arrangement is contemplated by this invention, the spring-load bias being supplementary to the bias caused by the weight of the closure. However, a spring will generally be an unnecessary expense and complication. The term "bias" means either the inherent closure force exerted by the weight of the closure, or by spring bias, or by both.

This invention thereby provides a very simple, inexpensive, expedient and inoffensive trap that is safe for the user and humane in its disposition of the rodent.

This invention is not to be limited by the embodiment shown in the drawings and described in the description which is given by way of example and not of limitation, but only in accordance with the scope of the appended claims.

I claim:

1. A mousetrap comprising: a housing having a bottom, a top, and a peripheral sidewall forming an enclosure in which to trap a mouse; a partition inside of and extending partway across said enclosure to form an elongated, U-shaped chamber having a first and a second arm at opposite sides of a bend; an entry port through said sidewall opening into said first arm; a closure hinged to said housing for rotation around a hinge axis, said closure having its hinged edge near said entry port and having a first cocked position where it is raised to leave the entry port open to entry by a mouse, and a second closed position where it closes said entry port and frustrates the exit of a mouse from the enclosure, said closure substantially occluding said entry port in its second position; a trigger in said second arm so disposed and arranged as to be depressed by a mouse, said trigger being hinged to said housing and having a first cocked position where it is raised to await a mouse, and a second released position after a mouse has depressed it; and a latch system holding said closure and trigger in their respective first positions comprising a deflectable post supported by said housing and having a latching surface spaced from the point of attachment of said post to said housing, whereby said post inherently tends to assume a first condition wherein said latching surface is in a first position, and a second condition wherein said latching surface is in a second position, one of said latching surface positions being respective to a cocked condition of the mouse trap, a finger rotatable with said closure around its hinge axis and so disposed and arranged as to rest on said latching surface when said latching surface is in its first position, and to be free to rotate when said latching surface is in its second position, a cam rotatable with said trigger around the hinge axis of said trigger having a first position respective to a first position of said trigger and first condition of said post when there is no mouse load on said trigger, thereby permitting said post to remain in its first position with the cam lightly abutting against it and the finger resting on said latching surface and thereby holding the closure and the trigger in their first position, a mouse load on said trigger moving the trigger to its second position, turning the cam to its second position to bend the post to its second condition, thereby moving the latching surface to its second position, releasing the finger from its first position to enable the closure to lower to its second position, to close the entry port and trap the mouse in the enclosure.

2. A mousetrap according to claim 1 in which said closure hinges upwardly and inwardly into said first arm of said enclosure.

3. A mousetrap according to claim 1 in which said cam is integrally formed with said trigger, and in which said finger is integrally formed with said closure, both said trigger and said closure including bearing portions enabling their respective hinge movements.

4. A mousetrap according to claim 3 in which said housing includes bearing mounts for said bearing portions.

5. A mousetrap according to claim 4 in which said mounts function as rests for said bearing portions.

6. A mousetrap according to cliam 1 in which said post is a monolithic stiffly flexible column rising from the bottom of said second arm, a bearing portion of said closure extending into said second arm, therein to contact said latching surface.

7. A mousetrap according to claim 6 in which said mounts function as rests for said bearing portions.

8. A mousetrap according to claim 7 in which said enclosure includes a top part and a bottom part, divided at a midelevation of the sidewall, whereby said closure and trigger can be mounted to said mounts, and the top part can be applied to the bottom part to contain them.

9. A mousetrap according to claim 8 in which a portion of the peripheral wall at said bend is removable for the purpose of removing a dead mouse.

10. A mousetrap according to claim 1 in which a portion of the peripheral wall at said bend is removable for the purpose of removing a dead mouse.

11. A mousetrap according to claim 1 in which a sill extends across the bottom of the entry port and frame members extend up its sides, which are closely abutted by the closure when the closure is in its second position.

12. A mousetrap according to claim 11 in which said sill and frame members, and the abutting closure edges, are bevelled.

13. A mousetrap according to claim 11 in which a latch is mounted to the floor of the housing, said latch including a releasable detent which permits the passage of the lower edge of the closure when it moves to its second position, and prevents the return of said closure to its first position unless said detent is released.

14. A mousetrap according to claim 13 in which said detent is on a flexure, and is released by bending the flexure to permit the edge of the closure to pass the detent.

15. A mousetrap according to claim 1 in which a barrier extends across the floor of the second arm adjacent to the free edge of the trigger to frustrate a mouse's movement beneath the trigger.

16. A mousetrap according to claim 1 in which the enclosure is molded from an organic plastic material the top and bottom being principally formed on two separate parts, each carrying at least a portion of the sidewall.

17. A mousetrap according to claim 16 in which the enclosure further includes an end cap closing an end of said housing.

18. A mousetrap according to claim 1 in which the housing is substantially a rectangular parallelipiped.

19. A mousetrap according to claim 3 in which said bearing portions are formed integrally as part of the respective trigger and closure.

20. A mousetrap according to claim 3 in which said closure hinges upwardly and inwardly into said first arm of said enclosure.

21. A mousetrap according to claim 20 in which said post is a monolithic stiffly flexible column rising from the bottom of said second arm, a bearing portion of said closure extending into said second arm, therein to contact said latching surface.

22. A mousetrap according to claim 21 in which said mounts function as rests for said bearing portions.

23. A mousetrap according to claim 22 in which a portion of the peripheral wall at said bend is removable for the purpose of removing a dead mouse.

24. A mousetrap according to claim 23 in which a sill extends across the botton of the entry port and frame members extend up the sides, which are closely abutted by the closure when the closure is in its second position.

25. A mousetrap according to claim 24 in which said sill and frame members, and the abutting closure edges, are bevelled.

26. A mousetrap according to claim 25 in which a latch is mounted to the floor of the housing, said latch including a releasable detent which permits the passage of the lower edge of the closure when it moves to its second position, and prevents the return of said closure to its first position unless said detent is released.

27. A mousetrap according to claim 26 in which a barrier extends across the floor of the second arm adjacent to the free edge of the trigger to frustrate a mouse's movement beneath the trigger.

28. A mousetrap according to claim 26 in which the enclosure is molded from an organic plastic material the top and bottom being principally formed on two separate parts, each carrying at least a portion of the sidewall.

* * * * *